E. M. HEYLMAN.
PLOW.
APPLICATION FILED FEB. 7, 1919.
1,344,586.
Patented June 22, 1920.
4 SHEETS—SHEET 2.
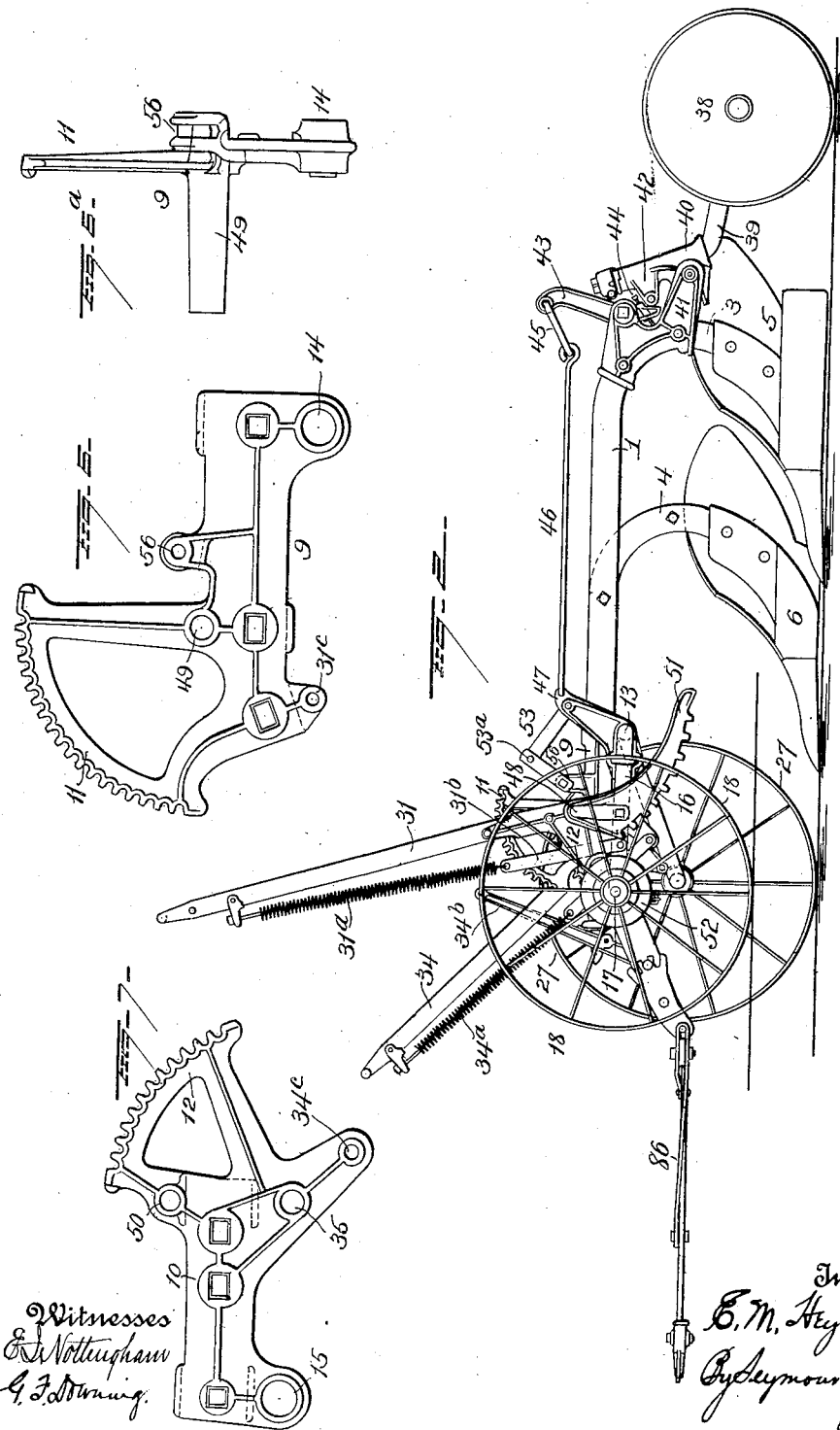

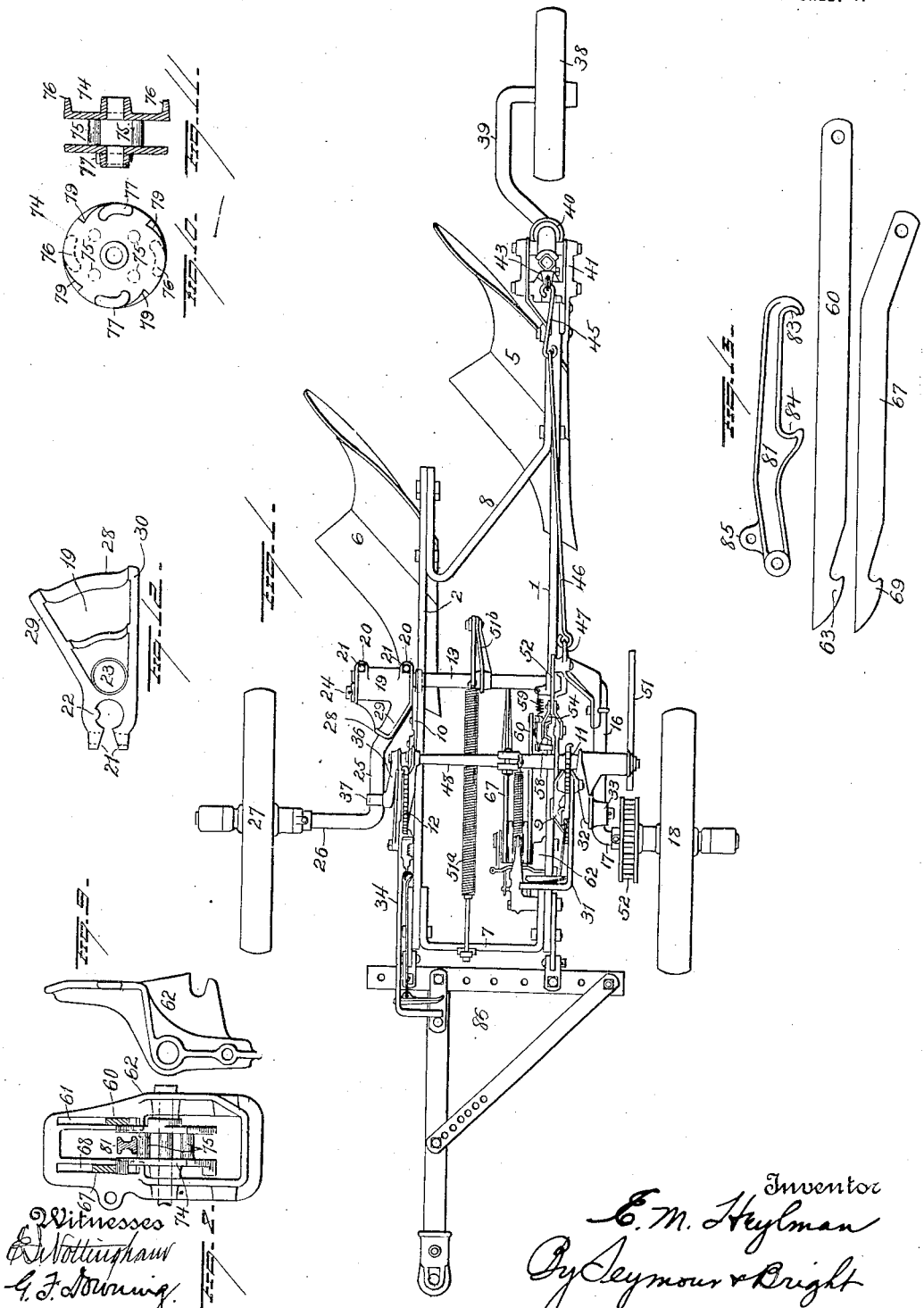

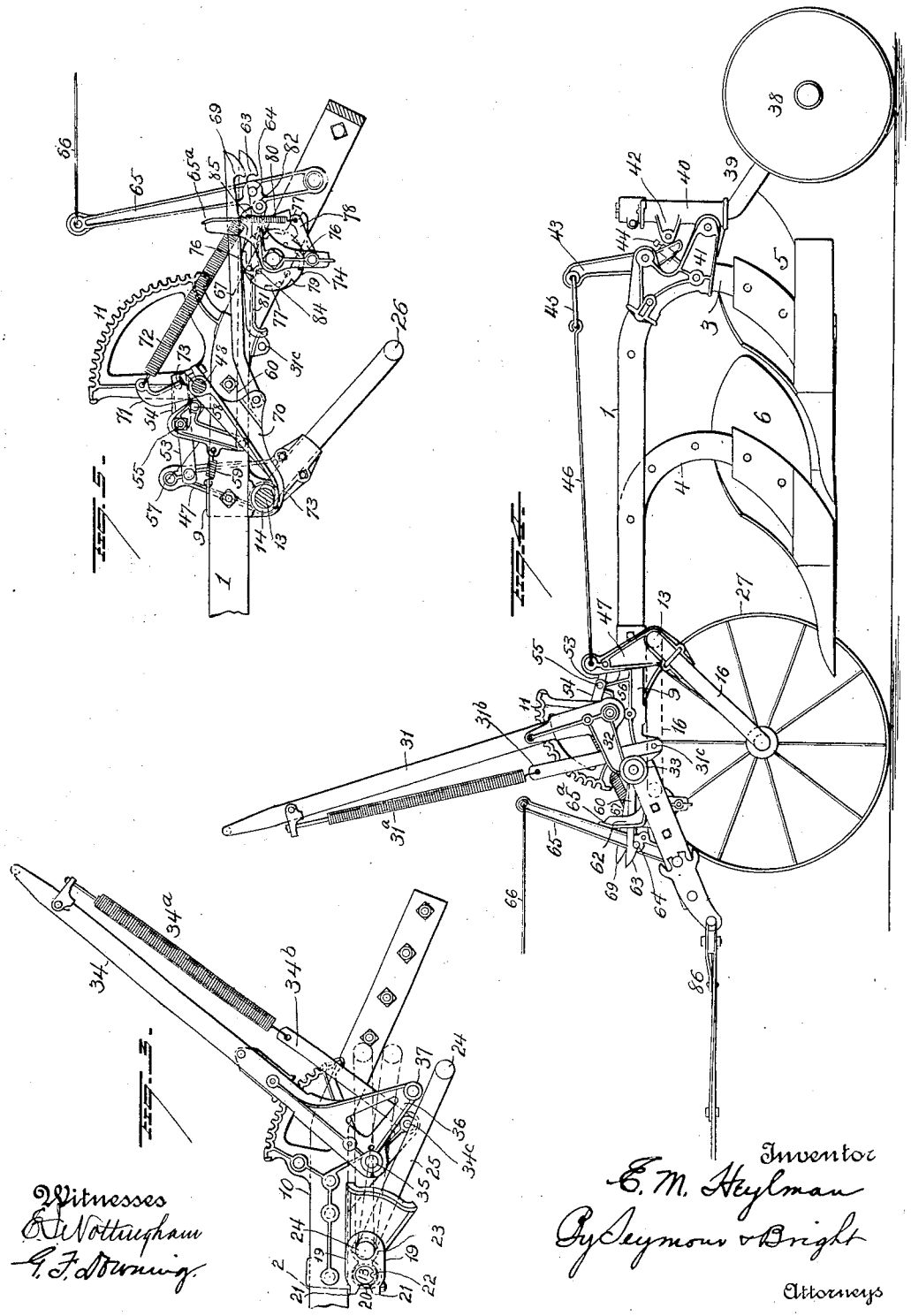

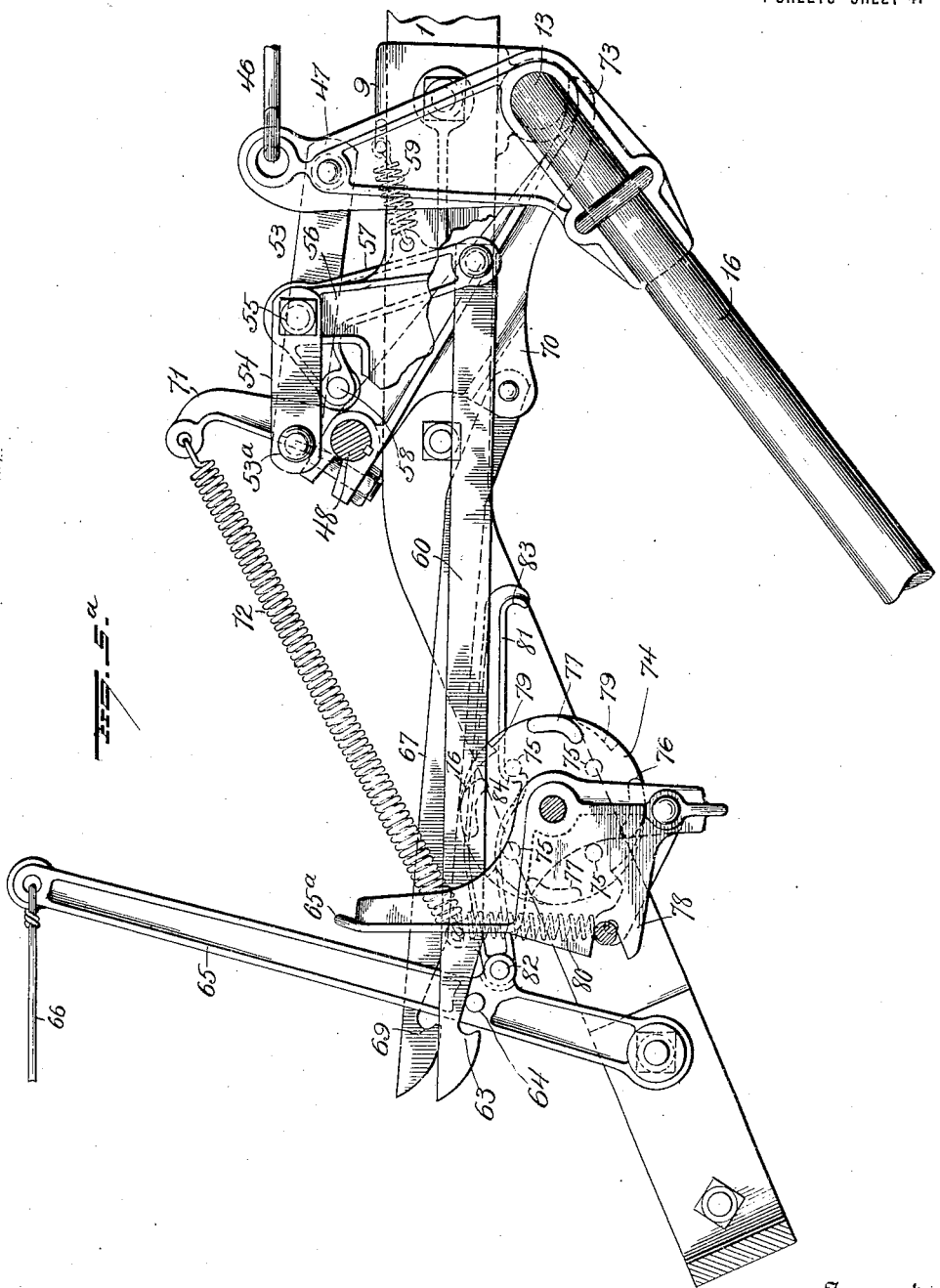

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

PLOW.

1,344,586.  Specification of Letters Patent.  Patented June 22, 1920.

Application filed February 7, 1919. Serial No. 275,582.

*To all whom it may concern:*

Be it known that I, EDWARD M. HEYLMAN, a citizen of the United States, and a resident of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and particularly to those of the engine-gang or tractor-drawn type,—one object of the invention being to provide, in such a plow construction, simple and efficient power lift mechanism.

A further object is to so construct raising and lowering means for a plow that successive manipulations of a lever will cause the plows to be raised and locked in raised position and lowered to working position.

A further object is to construct the power lift mechanism in such manner that alternate manipulations will operate to cause the plows to be raised and locked in raised position and so that other alternate manipulations of said lever will cause the plow to be unlocked and lowered to working position.

A further object is to provide a power lift mechanism which will operate to always lift the plow its full height, even if the depth regulating means be set to plow from two to ten inches deep.

With these and other objects in view, the invention consists in certain novel features of construction and combinations of parts as hereinafter set forth and pointed out in the claims.

In the accompanying drawings, Figure 1 is a plan view of a gang plow structure showing an embodiment of my invention; Fig. 2 is a side elevation; Fig. 3 is a view showing the lever mechanism which coöperates with the furrow wheel axle; Fig. 4 is a side elevation with certain parts omitted and showing lever mechanism which coöperates with the land wheel axle; Figs. 5 and 5ª are sectional views illustrating parts of the mechanism of the power lift; Figs. 6 and 6ª are detail views of the bracket 9; Fig. 7 is a detail view of the bracket 10; Figs. 8 and 9 are detail views showing the frame or bracket 62; Figs. 10 and 11 are detail views of the cam wheel; Fig. 12 is a detail view of the coupling for connecting the two axle members, and Fig. 13 is a view showing certain details of the tripping mechanism.

In the present instance I have shown a plow structure comprising two beams 1—2 having standard portions 3—4 at their rear ends, and to these standards, plow bases 5—6 are secured. The beams are suitably spaced apart and connected by front and rear braces 7 and 8,—said beams and braces thus forming a plow or beam frame.

Brackets 9 and 10 are secured to the respective beams, 1 and 2 and these brackets are formed with toothed segments 11 and 12 respectively, for a purpose hereinafter explained.

An axle 13 is mounted in hubs 14—15 on the respective brackets 9 and 10 and its horizontal portion is disposed under the respective beams 1, 2 so as to extend transversely thereof and from one to the other. At one end, the axle 13 is provided with a crank arm 16 and at the free end of the latter, a spindle 17 is provided to receive the hub of a land wheel 18. The other end of the axle 13 (at the furrow side of the plow structure) enters a coupling member 19, the latter being clamped to said axle 13 by means of bolts 20 passing through lugs 21, and said coupling member is also connected with the axle 13 by means of a key 22 shown in Figs. 3 and 12. The coupling member 19 is made with a bearing 23 for the pivotal mounting of an arm 24 at one end of an axle member or crank 25,—the latter being provided at its free end with a spindle 26 which enters the hub of a furrow wheel 27. The coupling member 19 is formed with a flaring arm or extension 28 having flanges 29—30 at its upper and lower edges between which the axle member 25 passes. It will be seen that by means of the coupling member 19, the two axle members 13 and 25 are connected together in such manner that one can move relatively to the other,—that the flanged extension will serve to limit the independent movements of the furrow-wheel axle member 25; that the upper flange 29 will engage the furrow-wheel axle member 25 and force the furrow wheel back so that it will aline with the land wheel when the plow has been raised by means of power lift mechanism which coöperates with the land-wheel axle member 13, as hereinafter described, and that the lower flange 30 of said coupling member arm will prevent the furrow wheel from "kicking back" under the pivot of the axle member 25 when the furrow wheel strikes a high or low place in the field.

A hand lever 31 is pivotally mounted on the hub 49 of the bracket 9 and provided with a suitable detent to engage the toothed segment 11. This lever is provided at its pivoted end with a forwardly projecting arm 32 carrying a roller 33, the latter being disposed over the crank 16 of axle member 13 near the forward end of said crank when the plow is in normal working position, said crank 16 being at that time, in an approximately horizontal position as shown in Fig. 2 and by dotted lines in Fig. 4. A balance spring 31$^a$ is connected at one end to the lever 31 and its other end is connected by a link 31$^b$ with the bracket 9 at 31$^c$.

A hand lever 34 is mounted upon the bracket 10 at 35 (Fig. 7) and is provided with a suitable detent to engage the toothed segment 12,—said lever being provided at its pivoted end with a forwardly projecting arm 36 having a pin or boss 37 disposed over the axle member 25 near the forward end thereof from which the spindle of the furrow wheel projects. A balance spring 34$^a$ is connected at one end to the lever 34 and the other end of this spring is connected by a link 34$^b$ with an arm 34$^c$ on the bracket 10. By locating the pin or boss 37 of the arm 36 near the forward end of the furrow wheel axle 24 when the furrow wheel is in working position, the springing effect of the axle will be reduced to a minimum, thus overcoming such springing of the axle as is liable to occur with constructions where the operating levers are applied to the upper pivotal portions of crank axles.

It will be observed that the hand levers 32 and 34 are not permanently connected with the axle members, but the parts 33 and 37 carried by these levers serve as stops for the axle members and by locating such stops over the axle members near the wheel-ends of the latter, the springing (above referred to) of the axle members by reason of the heavy downward pull on the wheels by the suction of the plow bases when passing through heavy spots in the field, will be prevented, and the changing of the adjustment of the plow for depth of plowing by reason of springing of axle cranks, will be avoided.

With the use of the jointed axle member, and adjusting levers, the movement of the front furrow wheel axle independently of the land wheel axle, allows the raising of the front furrow wheel on the frame so that the bottom of the wheel will be above the base of the front plow when opening up of a land, or making the first furrow, and when the front furrow wheel is adjusted low on the frame so the bottom of the wheel is on a line with the bottom of the front base when running in the bottom of the furrow, this movement allows of the adjusting of the land wheel up and down without imparting movement to the front furrow wheel for leveling the plow at different depths. To increase the depth, the furrow wheel may be raised and the plow leveled with the land wheel and to decrease the depth, the furrow wheel may be lowered and the plow leveled with the land wheel, and when the furrow is the correct depth, the lower side of the front furrow wheel should be on a line with the bottom of the front base.

By the construction and arrangement of adjusting levers and the parts with which they coöperate, as hereinbefore described, power-lift mechanism can be employed which can be operated to raise the plow structure to its full height regardless of the particular depth adjustment at which said levers may be set.

The rear end of the plow structure is supported on a rear follower or furrow wheel 38, the axle 39 of which, is mounted in a bearing sleeve 40, the latter being pivotally attached to a bracket 41 secured to the plow standard 3. The bearing sleeve 40 is provided with an arm 42 normally engaging one end of a lever 43, which is held in adjusted position by a screw 44. A slack link 45 is connected with the upper end of the lever 44 and this link is connected by a rod 46 with an arm 47 secured to and projecting upwardly from the axle member 13, so that when the latter is turned in a forward direction, motion will be transmitted through the rod 46, a slack link 45 and lever 43 to the bearing sleeve 40 to raise the rear end of the plow structure on the rear furrow wheel,—such operation being effected by the turning of the axle member 13 when the plow structure is raised by the power lift mechanism.

A rock-shaft 48 extends transversely across the plow beams forwardly of the axle member 13 and rearwardly of the axes of the wheels 18 and 27, bearings 49 and 50 being provided in the brackets 9 and 10 for the accommodation of said rock-shaft.

A toothed segment 51 is secured to one end of the rock-shaft 48 and is adapted (when said rock-shaft is turned in one direction) to be caused to mesh with a gear 52 secured to the hub of the land wheel 18, said gear being shown as of the "pin" type. It is apparent that when the toothed segment 51 is moved into mesh with the gear 52 while the plow is moving forwardly, motion will be imparted through said gear and segment to the forward portion of the plow beam frame, causing the same to rise and lift the plow bases out of the ground and such lifting of the plow structure will be assisted by the action of a balancing spring 51ᵃ connected at one end with the forward brace of the beam frame and its other end being connected with an arm 51ᵇ secured to the axle 13. During such upward movement of the beam-frame, the carrying wheels will move backwardly and the axle member 13 will thus be caused to turn and transmit motion to the mounting of the rear furrow-wheel (as previously explained) to raise the rear portion of the structure.

A link 53 is pivotally connected at one end with the arm 47 on the axle 13 and the other end of said link is connected at 53ᵃ with two shorter links 54, the other ends of the latter being pivotally connected at 55 with lugs 56 on the bracket 9. When the plow is in working position, the links 53—54 will assume the positions shown in Fig. 2, but when the plow is raised and the arm 47 is moved forwardly by the turning of the axle 13, said links will also move forwardly and downwardly until the pivotal connection 53ᵃ between the links 53—54 passes below the pivotal support of the links 54 at 55, as shown in Figs. 5 and 5ᵃ, thus forming a dead-center lock which will hold the plow beams and bases in raised position.

A bell-crank lever 57 (Figs. 5 and 5ᵃ) is pivotally mounted on a pin projecting from one of the lugs 56 of bracket 9 and the shorter arm of this bell-crank is provided with a pin 58 which is so disposed that when the plow is in its raised position, it will be under the links 53—54 in advance of the pivotal connection of the links 54 with the bracket 9,—said pin 58 being normally held in position to act as a stop for the downward movement of said links, by means of a spring 59 attached at one end to the bell-crank 57 which carries said pin and at the other end to the bracket 9. A latch bar 60 is pivotally attached at its rear end to the longer depending arm of the bell-crank 57 and extends forwardly through a slot 61 in a frame or bracket 62 secured to the forward portion of the beam frame in proximity to the beam 1,—the forward free end of said latch bar being beveled and formed with a hook 63 to be engaged by a pin 64 carried by a control lever 65 pivotally mounted on the forward portion of the beam frame near the beam 1. The lever 65 is adapted at its upper end for the reception of a cord 66 for operating the same from a tractor. A latch bar 67 passes through the slot 68 of the bracket frame 62, the forward end of this latch bar being beveled and formed with a hook 69 to be engaged by the pin 64 on lever 65. The rear end of the latch bar 67 is pivotally connected with an arm 70 secured to the rock-shaft 48, and the latter is provided with an arm 71, to which one end of a spring 72 is connected, the other end of said spring being attached to a driving bar or dog, as hereinafter explained. The spring 72 serves to retain the arm 70 in and return it to its normal position, the rearward movement of said arm being limited by the engagement of its free end portion 73 with the axle 13 as shown in Figs. 5 and 5ᵃ. The spring 72 also serves to retain the lever 65 in and to return it to its normal position, the upper portion 65ᵃ of the frame bracket 62 serving as a stop for said lever.

A cam wheel 74 (shown in detail in Figs. 10 and 11) is mounted in the frame bracket 62 and comprises two members spaced apart and the respective members of said cam-wheel are connected by four pins 75 spaced equi-distant apart as clearly shown in Fig. 10. The cam wheel 74 is also provided with four cams, two on each member of the wheel, as indicated at 76—76 and 77—77, and the cams of each pair are located diametrically opposite to each other, while the cams of the respective pairs are at right angles to each other. Thus, as viewed on Fig. 10 of the drawing, the cams of one pair alternate with the cams of the other pair. The cam wheel is so located with respect to the latch bars 60 and 67 that when said wheel is rotated the cams of one pair will operate to raise one of said latch bars and the cams of the other pair will operate to raise the other latch bar out of the path of movement of the pin 64 of the lever 65.

In the operation of the tripping mechanism, the cam wheel will be turned one-fourth of a revolution at each rearward throw of the lever 65 and in order that said cam wheel shall be held in the position to which it may be moved and prevented from retrograde rotation, a dog 78 is pivoted to the frame bracket 62 and provided with a tooth to engage notches 79 in the cam wheel,—four such notches being provided and located equi-distant apart. A spring 80 is provided for maintaining engagement of the dog 78 with the cam wheel.

A driving bar or dog 81 is pivotally attached at 82 to the operating lever 65 and passes between the members of the cam wheel 74,—said bar having hooks or shoulders 83—84 to coöperate with the pins 75 of said cam wheel. The forward end of the spring 72 is attached to a lug 85 on the driving bar, such connection of the spring to the driving bar being thus located above the pivotal connection of the latter and serving to insure proper engagement of said driving bar with the pins of the cam wheel.

In Figs. 5 and 5ᵃ of the drawing, the tripping mechanism is shown in the positions which the parts will assume when the plow structure is locked in raised position, and it may now be assumed that the operator desires to lower the plow to its working position. To accomplish this, the operator will pull the cord 66 and thus cause the lever 65 to be swung forwardly until the hook or stop 83 of the driving bar 81 engages one of the pins 75 of the cam wheel, said wheel being prevented from turning by the action of the dog 78. By reason of the engagement of the hooked end of the latch bar 60 with the pin 64, (as shown in Fig. 5) the forward movement of the lever 65 will cause longitudinal movement of said latch bar and the turning of the bell-crank 57. When the bell-crank is thus turned, its pin 58 will raise the link 53 sufficiently to break the dead-center lock and thus permit the plow structure to descend to working position. The operator will now release the cord 66 and the spring 72 will return the lever 65 to its normal position, the rearward movement of said lever being limited by the stop 65ª and the latch bar 60 and the bell-crank will be returned to their normal positions by the action of the spring 59. During the rearward or return movement of the lever 65, the driving bar 81 will also move rearwardly and the hook 84 of the latter engaging one of the pins 75 of the cam wheel 74, will cause the latter to be turned one-fourth of a revolution. When the cam wheel is thus turned, one of the cams 76 will ride from under the latch bar 67, permitting the latter to descend so that its hooked end will be in position to be engaged by the pin 64 when the lever 65 is again moved forwardly and during the same movement of the cam wheel, one of the cams 77 will move under the latch bar 60 and raise the same so that its hooked end will be out of operative relation to the pin 64 on the lever 65. Should the operator now move the lever 65 forwardly by a pull on the cord 66, motion will be imparted, through the latch bar 67 and arm 70 to move the same forwardly from the position shown in Fig. 5 and cause the rock-shaft 48 to be turned to lower the toothed segment 51 into mesh with the gear 52 on the hub of the land wheel. As the plow now moves forwardly, motion will be imparted through the gear and toothed segment to the beam frame to raise the latter and cause the same to be locked in its raised position, as previously explained. Forward movement of the lever 65 will also cause forward movement of the driving bar 81 and its hook or shoulder 84 to become disposed in front of one of the pins 75 of the cam wheel 74. The beam frame and plow bases carried thereby having been raised and locked, the operator will release the cord 66, thus permitting the lever 65 to be returned to its normal position by the action of the spring 72, the latter also serving to turn the rock-shaft 48 and raise the toothed segment 51 away from the gear 52 and to return the arm 70 to its normal position with its free end 73 resting against the axle 13, as shown in Fig. 5. During the return movement (last above described) of the lever 65, the rearward movement of the driving bar will cause a one-quarter turn of the cam wheel, thereby raising the hooked end of the latch bar 69 out of operation with the pin 64 and permitting the hooked end of the latch bar 60 to move into operative relation to said pin, so that at the next operation of the lever 65, the beam frame will be caused to descend to working position, as previously explained.

It will be apparent that with the construction and arrangement of tripping mechanism herein set forth, alternate manipulations of the lever 65 will cause the beam frame and plow bases to be raised, and that the other alternate manipulations of said lever will cause the beam frame and plow bases to be lowered. In other words, successive manipulations of the lever 65 will cause the beam frame and plow bases to be raised and then lowered, or vice versa.

Draft devices are indicated at 86 for connecting the plow structure with a tractor.

Various changes might be made in the details of my invention without departing from the spirit thereof or limiting its scope, and hence I do not wish to restrict myself to the precise details herein set forth.

Having fully described my invention, what I claim as new and desire to secure by Letters-Patent, is:—

1. In a plow structure, the combination with a wheeled frame and a plow base carried thereby, of power lift means coöperable with said frame and a wheel thereof, dead-center locking means for locking said frame in raised position, an operating lever, means for adjusting the power lift means to operative position, said means including a latch bar coöperable with said operating lever, means for breaking said dead-center lock including a latch bar coöperable with said operating lever, and means operable by said lever to raise and lower said latch bars alternately, whereby successive manipulations of said lever will effect the raising of the plow frame and the breaking of said dead-center lock.

2. In a plow structure, the combination with a wheeled frame and a plow base carried thereby, of power lift means for said frame, latch devices for said frame, an operating lever, two latch bars coöperable with said lever, means connected with one of said latch bars for adjusting the power lift means to operative position, means connected with the other latch bar for unlatching said latch devices, and means operable by the return movements of said lever to move said latch bars alternately into and out of operative relation to said lever.

3. In a plow structure, the combination with a wheeled frame and a plow base carried thereby, of a toothed segment mounted on the frame, a gear carried by a wheel of the wheeled frame, a latch bar operatively connected with said segment, an operating lever with which said latch bar is coöperable, and means controlled by said lever for moving said latch bar into and out of coöperable relation with said lever.

4. In a plow structure, the combination with a wheeled frame and a plow base carried thereby, of a rock-shaft mounted on said frame, a toothed segment secured to said rock-shaft, a gear on a wheel of the wheeled frame, with which said segment is coöperable, an arm secured to said rock shaft, a spring connected with said rock-shaft and normally retaining said segment out of engagement with the gear, a latch bar connected with said arm, a control lever with which said latch bar is coöperable, and means operable by said lever to move the latch bar into and out of operative relation to said lever.

5. In a plow structure, the combination with a wheeled frame and a plow base carried thereby, of a rock shaft mounted on the frame, a toothed segment secured to said rock-shaft, a gear on one of the wheels of the wheeled frame for coöperation with said segment, two arms secured to said rock shaft, a control lever, a spring between said control lever and one of said arms, a latch bar connected with the other of said arms and coöperable with said control lever, and means operable from the control lever for moving said latch bar into and out of operative relation to said lever.

6. In a plow structure, the combination with a wheeled frame and a plow base carried thereby, of a rock-shaft mounted on said frame, a toothed segment secured to the rock shaft, a gear on one of the wheels of the wheeled frame, coöperable with said segment, locking-up devices for said frame, a control lever, a lock-releasing device, an arm on the rock-shaft, a latch bar connected with said arm and coöperable with the control lever, a latch bar connected with said lock-releasing device and coöperable with said control lever, and means controlled by said control lever for moving said latch bars into and out of operative relation to said control lever alternately.

7. In a plow structure, the combination with a wheeed frame and a plow base carried thereby, of power lift means for said frame, locking-up means for said frame, a release device for said locking-up means, a control lever, a latch bar connected with the power lift means and coöperable with said control lever, a latch bar connected with said release device and coöperable with the control lever, a cam wheel coöperable with said latch bars to move the same into and out of operative relation to the control lever alternately, and a driving bar connected with the control lever for turning said cam wheel at each return movement of the control lever.

8. In a plow structure, the combination with a wheeled frame and a plow base carried thereby, of power lift means for said frame, locking-up means for the frame, a release device for the locking-up means, a control lever, a latch bar connected with the power lift means and coöperable with the control lever, a latch bar connected with said release device and coöperable with the control lever, a cam wheel having two pairs of cams coöperable respectively with said latch bars, the cams of one pair disposed at right angles to the cams of the other pair, pins carried by said cam wheel, and a driving bar connected with the control lever and coöperable with the pins of the cam wheel for turning the latter.

9. In a plow structure, the combination with a wheeled frame and a plow base carried thereby, of power lift means for said frame, locking-up means for said frame, a release device for the locking-up means, a control lever, a latch bar connected with the power lift means and coöperable with the control lever, a latch bar connected with said release device and coöperable with the control lever, a cam wheel having two pairs of cams coöperable respectively with said latch bars, pins carried by said cam wheel and spaced equi-distant apart, a driving bar connected with the control lever and having a part to coöperate with said pins to turn the cam wheel, said bar having a part to coöperate with said pins to limit the movement of the control lever in one direction, and a spring-pressed dog to engage said cam wheel and prevent movement thereof in one direction.

10. In a plow structure, the combination with a wheeled frame and a plow base carried thereby, of power lift means for said frame, locking-up means for the frame, a lock-releasing device for the locking-up means, a control lever, a bracket secured to the frame and forming a stop for the control lever, latch bars connected with said power lift means and lock-releasing device, said latch bars movable through said bracket and coöperable with the control lever, a cam wheel mounted in said bracket and having cams for moving said latch bars into and out of operative relation to the control lever alternately, a driving bar pivotally connected with the control lever, pins on the cam wheel to be engaged by said driving bar to turn said cam wheel, a dog to prevent retrograde rotation of the cam wheel, and a spring connected with said driving bar and operating to insure coöperation of the latter with the pins of the cam wheel and to effect return movement of the control lever.

11. In a plow structure, the combination with a frame, carrying wheels, and an axle member connecting the frame, and carrying wheels, of a rock-shaft mounted on the frame, a toothed segment secured to said rock-shaft, a gear on one of the carrying wheels, with which said segment is adapted to coöperate, an arm secured to the rock-shaft and having a part to engage the axle and form a stop to limit the movement of the rock-shaft when the segment is in inoperative position, a spring connected with the rock-shaft and operating normally to hold the segment in inoperative position, and means connected with said arm to turn the rock-shaft and move the toothed segment into operation with the gear on the carrying wheel.

In testimony whereof, I have signed this specification in the presence of two subscribing witnesses.

EDWARD M. HEYLMAN.

Witnesses:
 EDWIN NICAR,
 GEORGE R. LANPHERE.